US012696040B2

(12) United States Patent
Nielsen et al.

(10) Patent No.: US 12,696,040 B2
(45) Date of Patent: Jul. 28, 2026

(54) HEARING DEVICE WITH CORROSION PROTECTION AND RELATED METHOD

(71) Applicant: GN Hearing A/S, Ballerup (DK)

(72) Inventors: Henrik Nielsen, Roskilde (DK); Anders Hjermø Michaelsen, Bagsværd (DK)

(73) Assignee: GN HEARING A/S, Ballerup (DK)

( * ) Notice: Subject to any disclaimer, the term of this patent is extended or adjusted under 35 U.S.C. 154(b) by 148 days.

(21) Appl. No.: 18/648,311

(22) Filed: Apr. 26, 2024

(65) Prior Publication Data

US 2024/0422488 A1 Dec. 19, 2024

(30) Foreign Application Priority Data

Jun. 15, 2023 (EP) ..................................... 23179603

(51) Int. Cl.
*H04R 25/00* (2006.01)
*H01M 50/247* (2021.01)

(52) U.S. Cl.
CPC ........... *H04R 25/602* (2013.01); *H04R 25/65* (2013.01); *H01M 50/247* (2021.01); *H04R 2225/31* (2013.01)

(58) Field of Classification Search
CPC ... H04R 25/65; H04R 25/602; H04R 2225/31
USPC ........................................ 381/312, 322, 324
See application file for complete search history.

(56) References Cited

U.S. PATENT DOCUMENTS

| | | |
|---|---|---|
| 2002/0198437 A1 | 12/2002 | Juneau et al. |
| 2004/0120539 A1 | 6/2004 | Panitzsch |
| 2008/0063231 A1* | 3/2008 | Juneau ................. H04R 25/652 |
| | | 381/328 |
| 2016/0029133 A1* | 1/2016 | Cano .................... H04R 25/602 |
| | | 381/323 |
| 2022/0272466 A1 | 8/2022 | Bodvarsson et al. |

FOREIGN PATENT DOCUMENTS

| | | |
|---|---|---|
| DE | 19903090 A1 | 8/2000 |
| JP | 2001145197 A * | 5/2001 |

OTHER PUBLICATIONS

Extended European Search Report for EP Patent Appln. No. 23179603.8 dated Dec. 14, 2023.

* cited by examiner

*Primary Examiner* — George C Monikang
(74) *Attorney, Agent, or Firm* — Vista IP Law Group, LLP

(57) ABSTRACT

A hearing device and related method is disclosed, the hearing device comprising a housing forming at least a part of an outer surface of the hearing device; a frame arranged in the housing; a battery compartment comprising a first battery terminal and a second battery terminal; and a gel arranged in the battery compartment.

16 Claims, 4 Drawing Sheets

100

S102 Introduce gel

S102A

S104 Insert battery unit

S106 Close battery compartment

HEARING DEVICE WITH CORROSION PROTECTION AND RELATED METHOD

RELATED APPLICATION DATA

This application claims priority to, and the benefit of, European Patent Application No. EP 23179603.8 filed on Jun. 15, 2023, pending. The entire disclosure of the above application is expressly incorporated by reference herein.

FIELD

The present disclosure relates to a hearing device and related methods including a method of operating a hearing device.

BACKGROUND

Developments in the hearing industry requires the ability for independent service providers or end users to exchange a rechargeable battery. This requirement may introduce challenges due to corrosion which would degrade or even destroy performance of the hearing device.

SUMMARY

Accordingly, there is a need for improved protection of galvanic contacts in a hearing device.

A hearing device is disclosed, the hearing device comprising a housing forming at least a part of an outer surface of the hearing device; a frame arranged in the housing; a battery compartment comprising a first battery terminal and a second battery terminal; and a gel or low-viscosity fluid arranged in the battery compartment.

Also, a method for battery handling in a hearing device comprising a battery compartment is provided, the method comprising introducing gel or low-viscosity fluid into the battery compartment; inserting a battery unit comprising a battery in the battery compartment; and closing the battery compartment.

Traditional non-rechargeable battery will be exchanged considerably more frequent. Non-sealed battery compartment and the movement of sliding the non-rechargeable battery in and out help preventing and/or removing the corrosion of the galvanic contacts. However, in the case of a sealed battery compartment for rechargeable battery, moist generated within the sealed battery compartment due to e.g. temperature change, will cause the corrosion of the galvanic contacts. Therefore, advantageously, the gel introduced into the battery compartment protects galvanic contacts between battery springs and battery from corrosion.

It is an important advantage of the hearing device that battery terminals and battery connector elements are protected from galvanic corrosion, thereby increasing both lifetime of both hearing device and battery unit. Further, the present disclosure improves galvanic contact between battery terminals and the battery unit in turn providing reliant and fail-safe power supply to the hearing device.

The present disclosure allows for an independent service provider to perform a battery change in such a way that the quality and functionality of the hearing aid after the replacement is on par with a new hearing aid.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figures 1, 2:
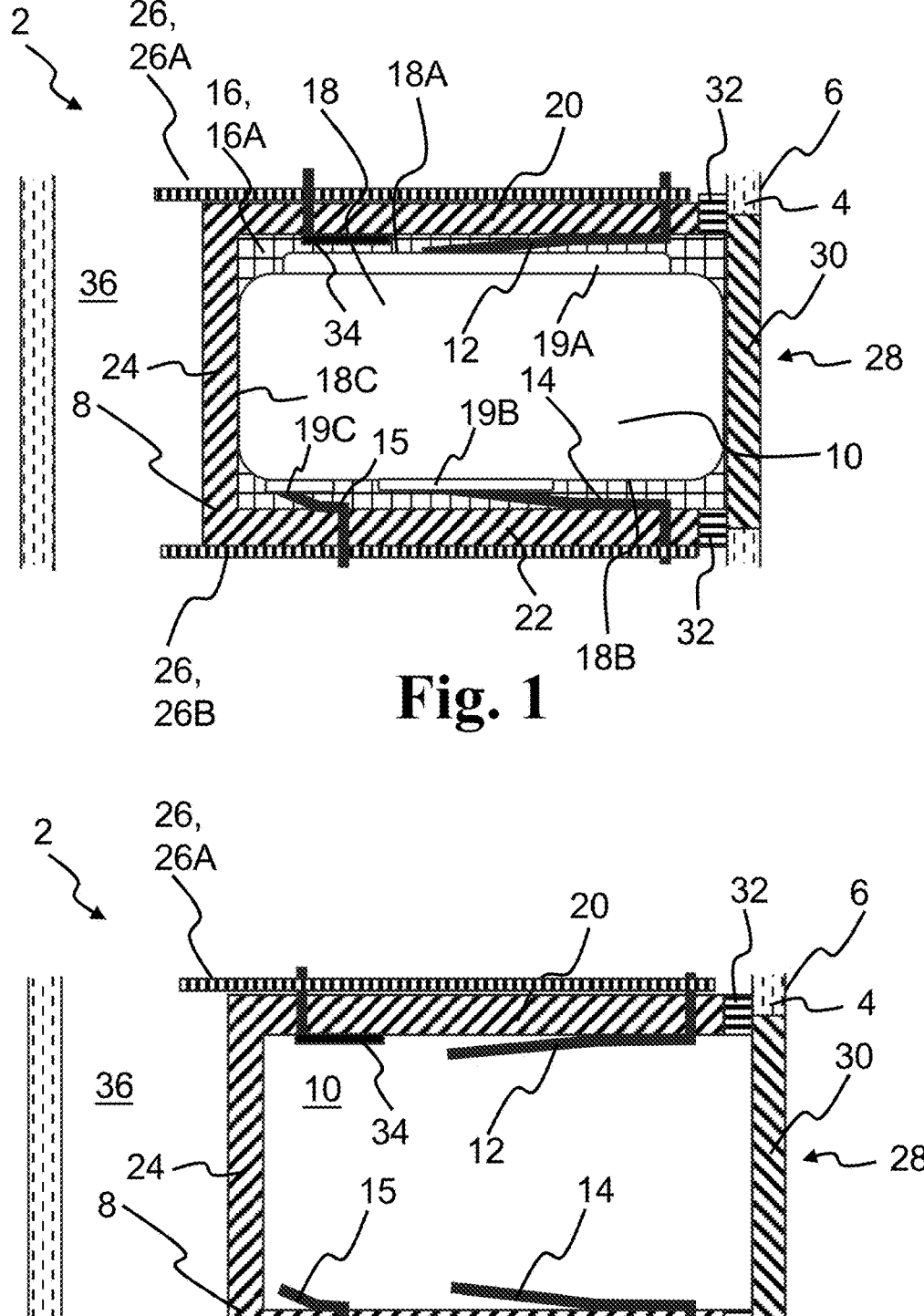
FIG. 1 schematically illustrates a cross section of an exemplary hearing device, FIG. 2 schematically illustrates the hearing device of FIG. 1, FIG. 3 schematically illustrates a cross section of an exemplary hearing device, FIG. 4 schematically illustrates the hearing device of FIG. 3.

Various exemplary embodiments and details are described hereinafter, with reference to the figures when relevant. It should be noted that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be configured to be worn at an ear of a user and may be a hearable or a hearing aid, wherein the processor is configured to compensate for a hearing loss of a user.

The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid. The hearing device may comprise a first earpiece and a second earpiece, wherein the first earpiece and/or the second earpiece is an earpiece as disclosed herein.

A hearing device and related method is disclosed, the hearing device comprising a housing forming at least a part of an outer surface of the hearing device. The housing may comprise one or more shells or outer parts.

The hearing device comprises a frame arranged in the housing. The frame may be configured to carry a printed circuit board, PCB, such as flexible PCB. In other words, the PCB or PCBA of the hearing device may be mounted on the frame. One or more electric components of the hearing device, such as one or more of processor, radio transceiver, power module, and microphone(s) may be mounted on the PCB.

The hearing device comprises a battery compartment. The battery compartment comprises a plurality of, such as three, four, or more battery terminals. The battery compartment comprises a first battery terminal and a second battery terminal. The battery compartment may comprise a third battery terminal and optionally a fourth battery terminal. The battery terminals are configured to electrically connect respective connector elements, such as anode, cathode and one or more controls of the battery unit when inserted to the PCB/PCBA or components thereof.

The hearing device optionally comprises a gel and/or fluid, such as a low-viscosity fluid, arranged in the battery compartment. The battery compartment may be a sealed battery compartment. A sealed battery compartment has several advantages in preventing both internal (inner compartment) and external humidity and sweat to reach and damage the battery unit or battery terminals. Further, a sealed battery compartment serves in preventing gel and/or acids from battery in case of battery failure from leaking internally, e.g. to inner compartment and damaging the electronic components in the inner compartment, and/or externally which may harm the user's skin.

The hearing device may comprise an inner compartment. The battery compartment is optionally separated, such as sealed, from the inner compartment to ensure that gel does not leak into the inner compartment from the battery compartment.

The hearing device may be configured for wireless communication with one or more devices, such as with another hearing device, e.g. as part of a binaural hearing system, and/or with one or more accessory devices, such as a smartphone and/or a smart watch. The hearing device optionally comprises an antenna for converting one or more wireless input signals, e.g. a first wireless input signal and/or a second wireless input signal, to antenna output signal(s). The wireless input signal(s) may origin from external source (s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

The hearing device optionally comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The hearing device comprises a processor for processing input signals from the microphone(s) and/or the radio transceiver. The processor provides an electrical output signal based on the input signals to the processor. Input terminal(s) of the processor are optionally connected to respective output terminals of the microphone(s) and/or the radio transceiver.

The hearing device comprises a processor for processing input signals, such as transceiver input signal(s) and/or microphone input signal(s). The processor is optionally configured to compensate for hearing loss of a user of the hearing device. The processor provides an electrical output signal based on the input signals to the processor.

In one or more examples, a hearing device is disclosed, the hearing device comprising a housing forming at least a part of an outer surface of the hearing device; a frame arranged in the housing; a battery compartment comprising a first battery terminal and a second battery terminal; and a gel arranged in the battery compartment.

In one or more examples, the gel is a non-conductive gel. In the present contest, the term non-conductive gel refers to and electrically con-conductive gel. In other words, the gel may be an electrically insulating gel.

The gel may be a thermally conductive gel, e.g. with a thermal conductivity larger than 1.0 W/m*K, such as larger than 5.0 W/m*K or even larger than 10.0 W/m*K. A thermally conductive gel improves the heat dissipation from the battery thereby increasing battery lifetime.

In one or more examples, the gel comprises silicone. The gel may be a one-component gel or a two-component gel. A first component of the gel may be composed of one or more of silicone resin, crosslinking agent and filler. A second component of the gel, such as the two-component gel, is composed of one or more of silicone resin, catalyst and filler.

In one or more examples, the gel comprises one or more of silicone resin, crosslinking agent, thermally conductive filler and curing agent.

The gel or low-viscosity fluid in the battery compartment may have a viscosity less than 50 kcP, such as in the range from 2 kcP to 45 kcP.

In one or more examples, the gel is or comprises a silicone-based compound or component, such as the product MOLYKOTE® 4 electrical insulating compound.

In one or more examples, the hearing device comprises a battery unit in the battery compartment. The battery unit may comprise a rechargeable battery.

The battery terminals of the hearing device are configured to connect the battery/battery unit arranged in the battery compartment to the power module and other electric components of the hearing device, e.g. via conductors, such as traces of PCB and/or wires, such as litz wires. One or more of the battery terminals may be metallic spring members.

The first battery terminal may be arranged in a wall of the battery compartment, such as the frame and/or the housing. For example, the first battery terminal may extend through a wall of the frame and/or the housing. The first battery terminal may be configured to contact a surface or first connector element of the battery unit, when the battery unit is inserted in the battery compartment.

The second battery terminal may be arranged in a wall of the battery compartment, such as the frame and/or the housing. For example, the second battery terminal may extend through a wall of the frame and/or the housing. The second battery terminal may be configured to contact a surface or second connector element of the battery unit, when the battery unit is inserted in the battery compartment.

The battery compartment may comprise a third battery terminal. The third battery terminal may be arranged in a wall of the battery compartment, such as the frame and/or the housing. For example, the third battery terminal may extend through a wall of the frame and/or the housing. The third battery terminal may be configured to contact a surface or third connector element of the battery unit, when the battery unit is inserted in the battery compartment.

In one or more examples, the battery compartment comprises a first wall, a second wall, and a third wall, the third wall connecting the first wall and the second wall. The first wall and the second wall may be plane walls. The first wall and the second wall may be parallel or extend in parallel planes.

The battery compartment may be formed by at least a part of the frame and/or formed by at least a part of the housing. The frame may form the first wall or at least a part thereof. The frame may form the second wall or at least a part thereof. The frame may form the third wall or at least a part thereof. The housing may form the first wall or at least a part thereof. The housing may form the second wall or at least a part thereof. The housing may form the third wall or at least a part thereof. In one or more examples, the housing forms at least a part of the first wall and/or the second wall, and the frame forms at least a part of the third wall.

The first battery terminal is optionally arranged on the first wall and may be configured to contact a first connector element on a first surface of the battery unit. The first surface of the battery unit faces the first wall of the battery compartment, when the battery unit is inserted in the battery compartment. The first battery terminal may be arranged on the second wall or the third wall and may be configured to contact the first connector element arranged on a second surface of the battery unit or on a third surface battery unit.

In one or more examples, the second battery terminal is arranged on the first wall, the second wall or the third wall. The second surface of the battery unit faces the second wall of the battery compartment, when the battery unit is inserted in the battery compartment. The third surface of the battery unit faces the third wall of the battery compartment, when the battery unit is inserted in the battery compartment. The second battery terminal may be arranged on the same wall as the first battery terminal. The second battery terminal may be configured to contact a second connector element on the second surface of the battery unit or on the third surface battery unit.

In one or more examples, the hearing device comprises a power module configured to charge the rechargeable battery. The power module is connected to the battery unit via the first battery terminal, the second battery terminal, and optionally via the third battery terminal.

In one or more examples, the hearing device has a battery opening in the outer surface, and the hearing device comprising a battery lid configured to close the battery opening. The battery lid may also be referred to as a battery door.

In one or more examples, the hearing device comprises a seal configured to seal the battery compartment between the battery lid and the housing and/or between the battery lid and the frame. The seal may be configured to seal the battery compartment between the housing and the frame.

In one or more examples, the hearing device comprising a temperature sensor arranged in the battery compartment. A temperature sensor in the battery compartment may allow for improved temperature management in the hearing device, e.g. during charging and/or normal use.

Also disclosed is a method for battery handling in a hearing device, such as a hearing device as disclosed herein.

In one or more examples, the method comprises introducing gel into the battery compartment; inserting a battery unit comprising a battery in the battery compartment; and closing the battery compartment.

In one or more examples, introducing gel into the battery compartment comprises introducing gel with a volume in the range from 5 mm³ to 300 mm³.

In one or more examples, the battery unit is inserted in the battery compartment after the gel is introduced into the battery compartment. Thereby, air pockets in the battery compartment may be avoided or reduced and improved filling of the battery cavity is facilitated, in turn reducing the risk of corrosion of battery terminals and contacts.

In one or more examples, the battery unit is inserted in the battery compartment before the gel is introduced into the battery compartment. Thereby, good contact between battery terminals and the battery is ensured while still allowing the gel to protect terminals and battery from corrosion.

It is noted that descriptions and features of hearing device functionality, such as hearing device configured to, also apply to methods and vice versa. For example, a description of a hearing device configured to determine also applies to a method, e.g. of operating a hearing device, wherein the method comprises determining and vice versa.

FIG. 1 shows a schematic cross section of a part of an exemplary hearing device. The hearing device 2 comprises a housing 4 forming at least a part of an outer surface 6 of the hearing device 2; a frame 8 arranged in the housing 4; a battery compartment 10 comprising a first battery terminal 12 and a second battery terminal 14; and a gel 16 arranged in the battery compartment 10 together with a battery unit 18. The battery unit 18 may be a rechargeable battery unit.

The gel is a non-conductive gel comprising silicone.

The battery compartment 10 comprises or is defined by a first wall 20, a second wall 22, and a third wall 24, the third wall 24 connecting the first wall 20 and the second wall 24. In the hearing device 2, the frame 8 forms the walls 20, 22, 24.

The first battery terminal 12 is arranged on the first wall 20 and is configured to contact a first connector element 19A on a first surface 18A of the battery unit 18. The second battery terminal 14 is arranged on the second wall 22 and is configured to contact a second connector element 19B on a second surface 18B of the battery unit 18, the second surface 18B being opposite the first surface 18A.

The hearing device 2 may comprise a third battery terminal 15. The third battery terminal 15 may be arranged on the second wall 22 and may be configured to contact a third connector element 19C on the second surface 18B of the battery unit 18. Depending on the battery design, the third battery terminal 15 may be arranged on the first wall 20 or the third wall 24 and may be configured to contact the third connector element 19C on the first surface 18A or a third surface 18C of the battery unit 18.

The hearing device 2 optionally comprises a power module configured to charge the rechargeable battery. The battery terminals 12, 14 are connected to the power module or power lines via conductors of PCB 26. The PCB 26 is optionally a flex-PCB may comprise a first region 26A and a second region 26B extending on a first side and a second side, respectively of the battery compartment 10. Wires (not shown) may connect the battery terminals 12, 14 to a PCB, such as PCB 26.

The hearing device 2 has a battery opening 28 in the outer surface 6, and the hearing device 2 comprises a battery lid 30 configured to close the battery opening 28. The hearing device 2 comprises a seal 32 configured to seal or close the battery compartment 10. The seal 32 is arranged between the battery lid 30 and the frame 8. Further, the seal 32 optionally is arranged between the frame 8 and the housing 4 and configured to seal an inner compartment 36 of the hearing device.

The battery compartment 10 is separated, such as sealed, from the inner compartment 36 to ensure that gel 16 does not leak into the inner compartment 36 from the battery compartment 10.

Optionally, the hearing device 2 comprises a temperature sensor 34 arranged in the battery compartment 10. The temperature sensor 34 may be connected to PCB 26 via conductors through one or more of walls 20, 22, 24.

FIG. 2 shows the hearing device 2 of FIG. 1 without the gel 16 and the battery unit 18 in the battery compartment 10.

Figures 3, 4:
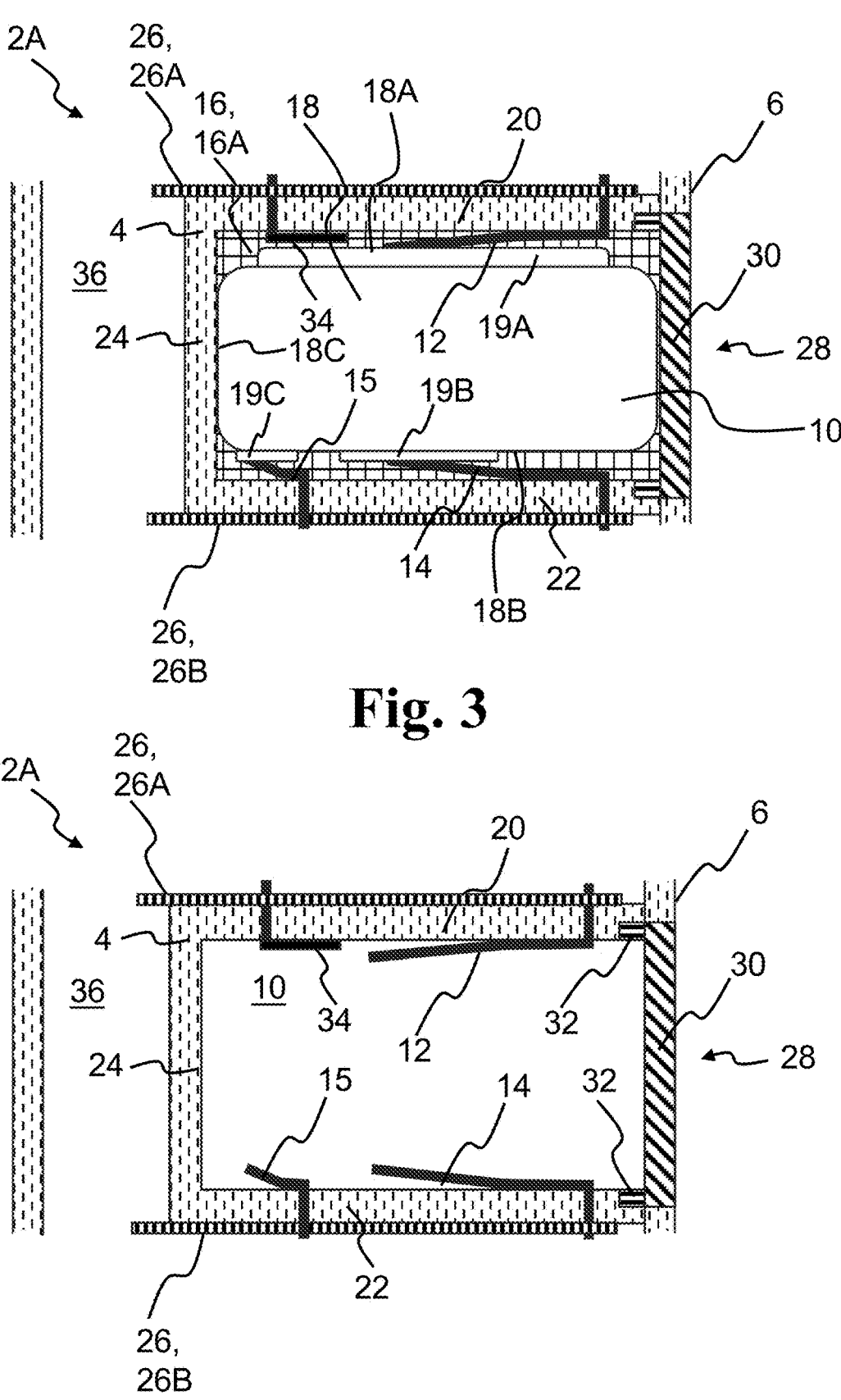

FIG. 3 shows a schematic cross section of a part of an exemplary hearing device. The battery compartment 10 of hearing device 2A comprises or is defined by a first wall 20, a second wall 22, and a third wall 24, the third wall 24 connecting the first wall 20 and the second wall 24. In the hearing device 2A, the housing 4 forms the walls 20, 22, 24. Thereby separation and sealing of the battery compartment 10 from an inner compartment 36 of the hearing device 2A are provided.

FIG. 4 shows the hearing device 2 of FIG. 1 without the gel 16 and the battery unit 18 in the battery compartment 10.

Figure 5:
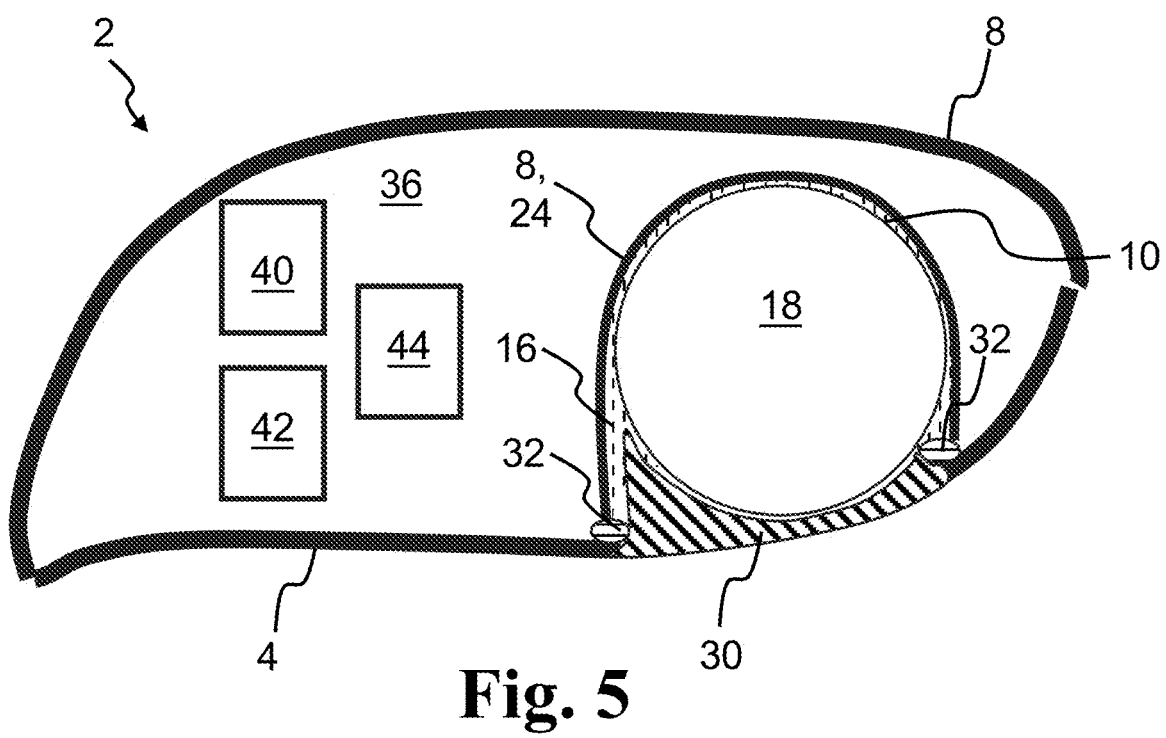
FIG. 5 is a schematic cross-sectional side view of the hearing device in FIG. 1.

FIG. 5 is a schematic side cross-sectional view of hearing device 2. The hearing device 2 comprises an inner compartment 36 accommodating electric components, such as processor 40, one or more microphones 42, and power module 44, the electronic components mounted on a PCB connected to the battery terminals (not shown in FIG. 5) arranged in the battery compartment 10. The inner compartment 36 is separated/sealed from the battery compartment 10 to prevent gel 16 or other low-viscosity fluid to leak from the battery compartment 10 to the inner compartment 36.

Figure 6:
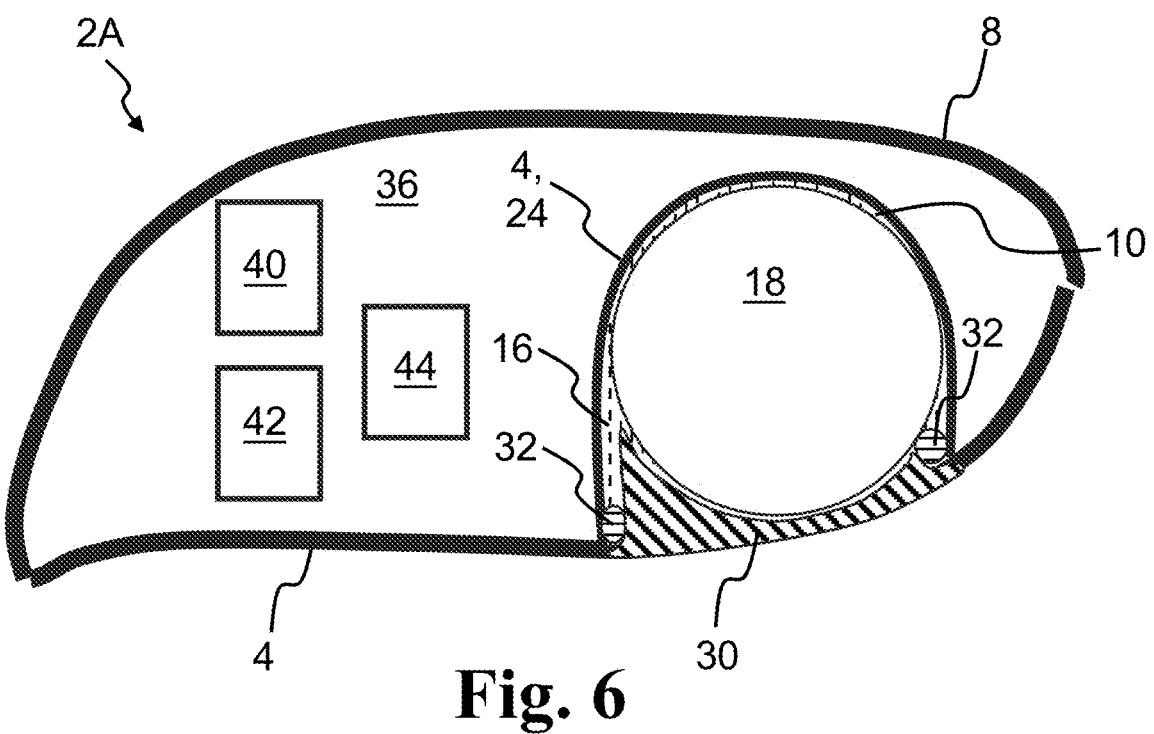
FIG. 6 is a schematic cross-sectional side view of the hearing device in FIG. 3.

FIG. 6 is a schematic side cross-sectional view of hearing device 2A. The hearing device 2A comprises an inner compartment 36 accommodating electric components, such as processor 40, one or more microphones 42, and power module 44, the electronic components mounted on a PCB connected to the battery terminals (not shown in FIG. 6) arranged in the battery compartment 10. The inner compartment 36 is separated/sealed from the battery compartment 10 to prevent gel 16 or other low-viscosity fluid to leak from the battery compartment 10 to the inner compartment 36.

Figure 7:
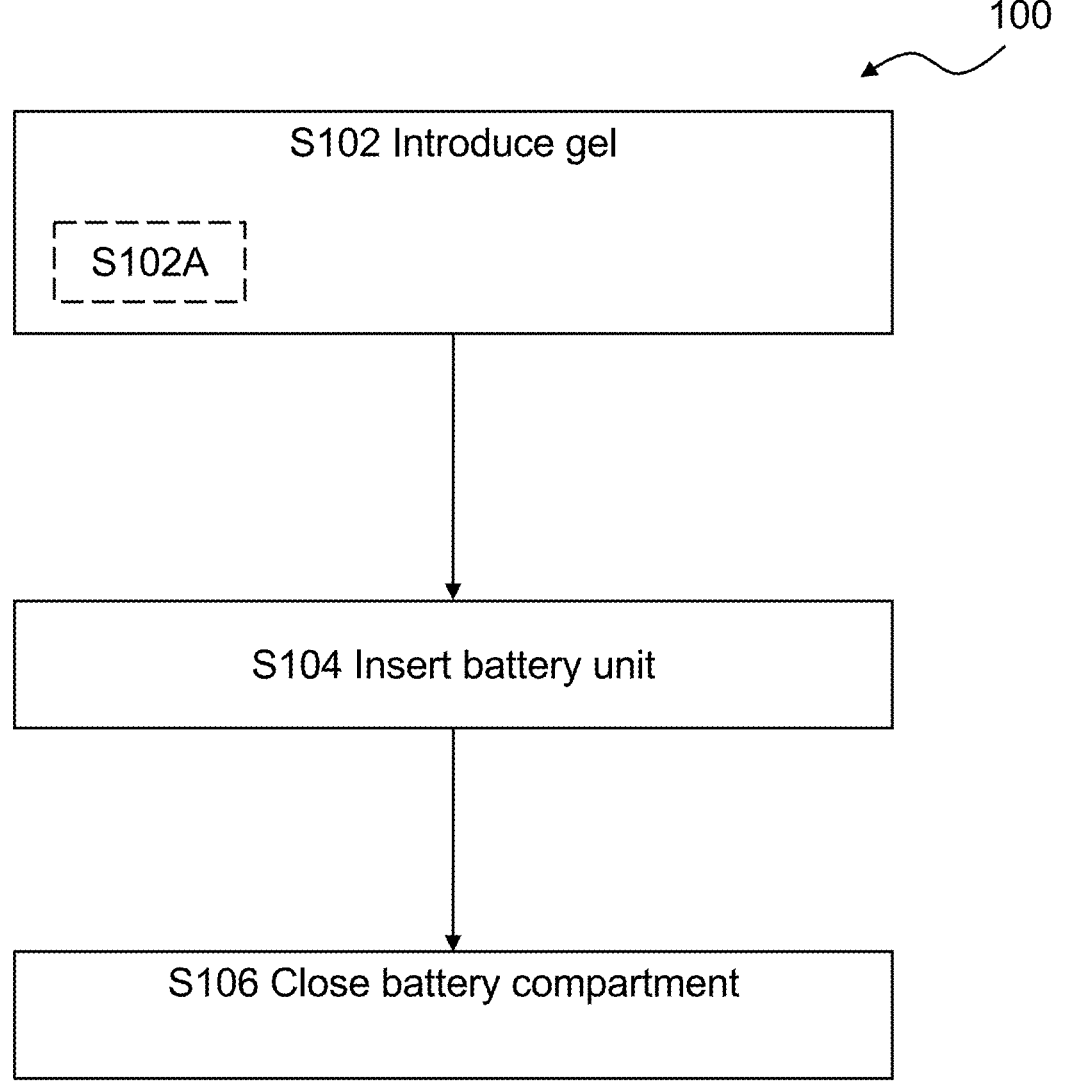
FIG. 7 is a flow diagram of an exemplary method according to the disclosure

FIG. 7 is a flow diagram of an example method for battery handling in a hearing device, such as hearing device 2, 2A, the hearing device comprising a battery compartment, wherein the method 100 comprises introducing S102 gel into the battery compartment; inserting S104 a battery unit comprising a battery in the battery compartment; and closing S106, such as sealing, the battery compartment.

In the method 100, introducing gel into the battery compartment comprises introducing S102A gel, such as a gel or other low-viscosity fluid as described herein, with a volume in the range from 5 mm³ to 300 mm³.

In the method 100, the battery unit may be inserted in the battery compartment after the gel is introduced into the battery compartment.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that the figures comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

2, 2A hearing device
4 housing
6 outer surface of the hearing device
8 frame
10 battery compartment
12 first battery terminal
14 second battery terminal
15 third battery terminal
16 gel
16A low-viscosity fluid
18 battery unit
18A first surface of battery unit

18B second surface of battery unit
18C third surface of battery unit
19A first connector element
19B second connector element
19C third connector element
20 first wall
22 second wall
24 third wall
26 printed circuit board, PCB
26A first region of PCB
26B second region of PCB
28 battery opening
30 battery lid
32 seal
34 temperature sensor
36 inner compartment
40 processor
42 one or more microphones
44 power module
100 Method for battery handling in a hearing device
S102 introducing gel into the battery compartment
S102A introducing gel with a volume in the range from 5 mm³ to 300 mm³
S104 inserting a battery unit comprising a battery in the battery compartment S106 closing the battery compartment

The invention claimed is:

1. A hearing device comprising:
a housing forming at least a part of an outer surface of the hearing device;
a frame in the housing;
a battery compartment comprising a first battery terminal and a second battery terminal; and
a gel in the battery compartment;
wherein the battery compartment comprises a first wall, a second wall, and a third wall, the third wall connecting the first wall and the second wall, wherein the first battery terminal is on the first wall.

2. The hearing device according to claim 1, wherein the gel is a non-conductive gel.

3. The hearing device according to claim 1, wherein the gel comprises silicone.

4. The hearing device according to claim 1, wherein the gel comprises one or more of a silicone resin, a crosslinking agent, a thermally conductive filler, or a curing agent.

5. The hearing device according to claim 1, wherein the second battery terminal is on the second wall or the third wall.

6. The hearing device according to claim 1, further comprising a battery unit in the battery compartment, wherein the battery unit comprises a rechargeable battery.

7. The hearing device according to claim 6, further comprising a power module configured to charge the rechargeable battery.

8. The hearing device according to claim 1, wherein the housing comprises a battery opening at the outer surface, and wherein the hearing device further comprises a battery lid configured to close the battery opening.

9. The hearing device according to claim 8, further comprising a seal between the battery lid and the housing and/or between the battery lid and the frame.

10. The hearing device according to claim 1, further comprising a temperature sensor in the battery compartment.

11. A method performed by a hearing device having a battery compartment, the method comprising:
receiving a gel by the battery compartment of the hearing device; and
receiving a battery by the battery compartment;
wherein the battery compartment comprises a first wall, a second wall, and a third wall, the third wall connecting the first wall and the second wall, and wherein the hearing device comprises a first battery terminal on the first wall.

12. The method according to claim 11, further comprising separating the battery from an environment by a battery lid of the hearing device.

13. The method according to claim 11, wherein the gel received by the battery compartment has a volume that is anywhere from 5 mm³ to 300 mm³.

14. The method according to claim 11, wherein the battery is received by the battery compartment after the gel is received by the battery compartment.

15. The method according to claim 11, wherein the hearing device comprises a battery lid and a housing, and wherein the method further comprises providing a seal between the battery lid and the housing.

16. The method according to claim 11, wherein the hearing device comprises a battery lid, a housing, and a frame in the housing, and wherein the method further comprises providing a seal between the battery lid and the frame.

* * * * *